(12) United States Patent
Brockett et al.

(10) Patent No.: US 8,957,593 B2
(45) Date of Patent: Feb. 17, 2015

(54) MULTIPLE PULSE WIDTH MODULATION WAVEFORMS FOR PLASMA LAMP

(75) Inventors: Timothy Brockett, Santa Monica, CA (US); David Schmelzer, West Hartford, CT (US); Aric Dorschner, Encino, CA (US); Jacob Portukalian, Canoga Park, CA (US); Mehran Matloubian, Encino, CA (US)

(73) Assignee: TOPANGA USA, Inc., Canoga Park, CA (US)

( * ) Notice: Subject to any disclaimer, the term of this patent is extended or adjusted under 35 U.S.C. 154(b) by 218 days.

(21) Appl. No.: 13/602,030

(22) Filed: Aug. 31, 2012

(65) Prior Publication Data

US 2014/0062298 A1  Mar. 6, 2014

(51) Int. Cl.
*H05B 41/24* (2006.01)
*H01J 65/04* (2006.01)

(52) U.S. Cl.
CPC .................................. *H01J 65/042* (2013.01)
USPC ........... 315/248; 315/149; 362/194; 313/607; 313/634

(58) Field of Classification Search
USPC ............ 315/248, 149; 313/607, 634; 362/194
See application file for complete search history.

(56) References Cited

U.S. PATENT DOCUMENTS

| | | | |
|---|---|---|---|
| 5,113,121 A | 5/1992 | Lapatovich | |
| 5,228,770 A * | 7/1993 | Brunson | 362/194 |
| 5,508,592 A | 4/1996 | Lapatovich | |
| 5,565,820 A * | 10/1996 | Peyrotte et al. | 332/110 |
| 6,617,806 B2 | 9/2003 | Kirkpatrick | |
| 7,279,840 B2 * | 10/2007 | Chandler et al. | 313/634 |
| 7,791,280 B2 | 9/2010 | DeVincentis | |
| 7,830,092 B2 | 11/2010 | Espiau et al. | |
| 8,188,662 B2 * | 5/2012 | Hafidi et al. | 313/607 |
| 8,232,734 B2 * | 7/2012 | Newman et al. | 315/224 |

\* cited by examiner

*Primary Examiner* — Douglas W Owens
*Assistant Examiner* — Syed M Kaiser
(74) *Attorney, Agent, or Firm* — Kilpatrick Townsend and Stockton LLP (57) ABSTRACT

This disclosure is directed to devices and methods for generating light with electrode-less plasma lamps. More particularly, the present invention provides plasma lamps driven by a radio-frequency source without the use of electrodes inside the bulb, and a pulse-width modulation device that provides RF power regulation, and related methods. The bulb comprises gaseous material with metal halides and/or light emitters that, when powered, substantially stays in an arc shape state. The switching pulse-width modulation device is operable at specific modulation frequencies, duty cycles, and durations to stabilize or control the arc state/mode, which enables consistent and high efficiencies.

26 Claims, 10 Drawing Sheets

MULTIPLE PULSE WIDTH MODULATION WAVEFORMS FOR PLASMA LAMP

CROSS-REFERENCES TO RELATED APPLICATIONS

This application is related to U.S. Pat. No. 7,830,092, which is commonly owned, and hereby incorporated by reference.

BACKGROUND OF THE INVENTION

The present invention is directed to devices and methods for generating light with plasma lamps. More particularly, the present invention provides plasma lamps or high intensity discharge lamps driven by a radio-frequency source without the use of electrodes inside the bulb and related methods. Plasma lamps provide extremely bright, broadband light and are useful in applications such as stadiums, security, parking lots, military and defense, street lighting, large and small buildings, vehicle headlamps, aircraft landing, bridges, warehouses, agricultural and horticultural lighting, architectural and decorative lighting, stage lighting, billboard lighting, spot lighting, medical illumination, microscopes, projectors and displays, any combination of these, and the like. Plasma lamps can also be optimized to generate UV radiation and can be used in applications such as UV water treatment, ink drying, epoxy curing and the like.

BRIEF SUMMARY OF THE INVENTION

This disclosure is directed to devices and methods for generating light with plasma lamps or high intensity discharge lamps. More particularly, the present invention provides plasma lamps driven by a radio-frequency source without the use of electrodes inside the bulb and related methods, and a pulse-width modulation device that uses a novel combination of two or more modulation waveforms to modulate the RF source and allows the bulb to operate efficiently in any orientation with a stable arc that does not come in contact with the wall of the bulb, split, flicker, or rotate, or combinations thereof. That is, the stable arc is substantially free from unstable modes including contact with the wall, split, flicker, or rotate, or combinations thereof. The bulb fill comprises gaseous material, such as argon, and light emitter such as one or more metal halide salts such that when a high electric field is applied to the bulb the gas and the light emitter form a plasma that emits light with most of the light being emitted by an arc that is in a particular state/mode. The pulse-width modulation device operates at specific modulation frequencies and waveforms to stabilize the arc mode, which translates to consistent and high efficiencies. There are other embodiments as well.

In a specific embodiment, the present invention provides a method for operating a plasma lamp apparatus. The method includes supplying RF power to a bulb of a plasma lamp. The bulb comprises a gaseous fill material. The RF power comprises a first pulse width modulation (PWM) waveform, a second PWM waveform, and an Nth PWM waveform. The first PWM waveform is characterized by a first duty cycle, a first frequency, and a first duration. The second PWM waveform is characterized by a second duty cycle, a second frequency, and a second duration. The method includes switching the RF power from the first PWM waveform to the second PWM waveform to cause change in a plasma discharge from the bulb from a first arc mode to second arc mode. As used herein, the term "first" and "second" does not necessarily imply order or limit the number of waveforms to the integer 2, but are merely intended to recite aspects of the present method.

In an alternative specific embodiment, the present invention provides a plasma lamp apparatus. The apparatus includes a bulb comprising a fill material and a resonator structure coupled to the bulb. The apparatus has an RF power source capable of generating a first PWM waveform and a second PWM waveform. The RF power source comprises an output, which is coupled to the bulb via the resonator structure. The apparatus has a PWM module comprising a switch device configured to the output of the RF power source. The apparatus includes a microcontroller device coupled to the PWM module. The microcontroller device is capable of controlling an output of the RF power source to switch via the PWM module from the first PWM waveform to the second PWM waveform.

According to an embodiment, the present invention provides a method for operating an electrode-less plasma lamp or high intensity discharge lamp. The method includes providing the electrode-less plasma lamp. The plasma lamp includes a power source and a bulb. The bulb comprises a gaseous filling material, that forms a plasma once it is excited, comprising of a noble gas such as Argon and one or more light emitters such as metal halide salts. The power source is configured to couple RF signals at a carrier frequency to the bulb. The carrier frequency is between 1 MHz and 2500 MHz. The power source includes a Pulse-Width Modulation (PWM) module for providing pulse-width modulation to the RF signals. The pulse-width modulation is characterized by a modulation frequency between 0 KHz and 200 KHz. The method further includes providing RF signals to the bulb with a first PWM modulation frequency range to modulate at least the gaseous filling material of the bulb. The gaseous filing material form a light characterized by a non-linear and time-dependent first arc mode. The method additionally includes providing RF signals to the bulb with a second PWM modulation frequency range to modulate at least the gaseous filling material of the bulb. The gaseous filing material forms a light characterized by a second arc mode. The second arc mode is different from the first arc mode. By controlling the frequency and duration of the first PWM and second PWM the arc mode can be varied. One can switch between the first PWM waveform and second PWM waveform to straighten the arc of the plasma lamp or stabilize the arc of the plasma lamp as the orientation of the lamp is changed. Combinations of two, three, or more switching PWM waveforms are also possible in the embodiment.

According to another embodiment, the present invention provides a method for operating a plasma lamp apparatus. The method includes generating an RF signal from a signal generating source. The method further includes coupling the RF signal to an excitation structure coupled to a bulb having a fill material. The bulb is formed from a transparent or translucent material. The method also includes exciting the fill material to form an arc within the bulb to cause output of electromagnetic radiation. The method additionally includes modulating the RF signal to generate several pulse width modulated (PWM) waveforms to maintain the arc within a spatial region of the bulb.

According to yet another embodiment, the present invention provides a method for operating a plasma lamp apparatus. The method includes providing the plasma lamp, which includes a power source and a bulb. The bulb includes gaseous filling material, that forms a plasma once it is excited, comprising of a noble gas such as Argon and one or more light emitters such as metal halide salts. The power source is configured to provide RF signals at a carrier frequency to the bulb. The carrier frequency is about 1 MHz to 2500 MHz. The power source includes a PWM module for providing pulse-width modulation for the RF signals. The pulse-width modulation is characterized by a modulation frequency of about 0 KHz to 200 kHz. The method additionally includes providing RF signals to the bulb at a first PWM duty cycle to excite at least the gaseous filling material of the bulb. The gaseous filing material forms a light characterized by a first arc mode. The method also includes providing RF signals to the bulb at a second PWM duty cycle to excite at least the gaseous filling material of the bulb. The gaseous filing material forms a light characterized by a second arc mode, the second arc mode being different from the first arc mode. By using a combination of two (or more) PWM waveforms with different duty cycles the arc is stabilized as the orientation of the lamp is changed.

In another embodiment, the PWM switching technique described above is used to straighten the arc in an electroded high intensity discharge metal halide lamp. By incorporating a switching PWM module into the power source of the metal halide lamp, two or more PWM waveforms of different duty cycles and durations can be used to straighten the arc, or control the arc inside the bulb.

It is to be appreciated that embodiments of the present invention provide various advantages over conventional techniques. By using switching PWM with two or more PWM waveforms with different duty cycles or frequencies, embodiments of the present invention allow electrode-less plasma bulbs to be positioned at different angles with stable arcs, thereby widening the application and improving the usability. In addition, the switching PWM technique described in the present invention can be used to stabilize arc of light emitting plasma for high performance and efficacy, improved reliability, and lower cost. The switching PWM technique can be implemented as a part of existing plasma lighting apparatus. For example, switching PWM can be a part of the RF driver that is used to generate continuous waves that powers a plasma bulb. The switching PWM can also be a part of the power supply of the RF driver. There are other embodiments as well.

BRIEF DESCRIPTION OF THE DRAWINGS

FIG. 3B illustrates the desirable arc shape with bulb in horizontal position and with PWM on.

DETAILED DESCRIPTION OF THE INVENTION

A conventional electrode-less plasma lamp comprises of a bulb with a mixture of an inert gas (such as Argon) and trace substances (such as metal halides) inside either a transparent bulb (made from a material such as quartz) or a translucent bulb (made from a material such as polycrystalline alumina). The gas and metal halide inside the bulb are excited to form a plasma by applying a high RF field across the bulb ionizing the gas inside the bulb and exciting the trace substances to form a plasma and emit light. Techniques have been developed to apply the RF field to the bulb including compact air resonators (U.S. Pat. No. 7,830,092, which is commonly owned, and hereby incorporated by reference), dielectric resonators (U.S. Pat. No. 7,791,280), as well as other approaches (U.S. Pat. Nos. 6,617,806 and 5,113,121).

The light emission from the plasma inside the bulb occurs primarily from an arc (comprising of higher density plasma) that is formed along the length of the bulb. In electrode-less plasma lamps the arc inside the bulb is dependent on the orientation of the bulb (as well as other parameters such as the dimensions of the bulb, the gas and chemicals inside the bulb, and pressure). As the bulb is oriented in different directions (for example pointing down or pointing horizontal) the impact of thermal gradients inside the bulb and/or buoyancy of the arc changes the position of the arc inside the bulb causing it to move away from the center of the bulb or changes the stability of the arc resulting in a split arc (two or more arcs), an arc that moves/rotates around (is unstable), an arc that flickers (visual oscillations), or an arc that touches the wall of the quartz bulb. For a number of applications such as architectural lighting and spot lighting is desirable to position the lamp in different orientations. However, the movement of the arc results in reducing overall performance of the lamp (lumens output, efficacy) and in the case of the arc touching the quartz wall, reducing the reliability and lifetime of the lamp. Techniques have been used to try to overcome the dependence of the arc on the orientation of the bulb and/or make the arc stable. These techniques have included using acoustic modulation by either using amplitude modulation (AM) or pulse width modulation (PWM) of the RF source to cause the arc to be less dependent on the orientation of the bulb or stabilize the arc (U.S. Pat. No. 5,508,592). For acoustic modulation using AM, the RF driver must provide large swings in power level resulting in an RF amplifier that has poor efficiency and requiring a much larger power transistor to deliver the average power that is needed to operate the lamp and achieve the same lumens output without acoustic modulation using AM. With acoustic modulation using PWM the overall efficiency of the RF power amplifier is improved over AM modulation, however the power amplifier still requires much higher overhead to deliver the average power needed. This results either in an amplifier that is less reliable or more expensive and less efficient because of the use of a larger power transistor. Such approaches have shortcomings resulting in a lamp that is still highly orientation dependent or as a result of using AM or PWM of the RF source, a significantly lower system efficacy. These and other limitations are overcome with the present method and apparatus, which will be described throughout the present specification and more particularly below.

This disclosure is directed to devices and methods for generating light with plasma lamps. More particularly, the present invention provides plasma lamps driven by a radio-frequency source without the use of electrodes inside the bulb and related methods, and a pulse-width modulation device provides RF power regulation. The bulb comprises gaseous material that, when powered with an RF source, substantially stays in an arc shape state (mode). The pulse-width modulation device operates at two or more modulation frequencies, duty cycles, and durations to control and stabilize the arc state/mode, which translates to consistent and high efficacies. There are other embodiments as well. PWM modulation with a single fixed duty cycle has been used for arc shaping and stabilization. However, the modulation duty cycles required will add overhead to the power amplifier that is needed to achieve the same average RF power with the modulation off. For example for a single PWM waveform with a fixed 75% duty cycle (75% on time and 25% off time) a power amplifier with an output power of 267 Watts has to be used to deliver an average power of 200 Watts to the bulb. This requires using a much larger power transistor that is capable of delivering 267 W instead of 200 W and is typically less efficient resulting in higher cost and lower performance. If a single waveform PWM with a longer duty cycle, such as duty cycle of 95%, is used the overhead for the power amplifier required is much less (210 W for 200 W average) but single waveform PWMs with 95% duty cycle are not capable of stabilizing most arcs. In this invention the PWM waveform comprises of two or more waveforms where typically one of the waveforms has a longer duty cycle than the other ones. In one embodiment for example, one of the waveforms has a duty cycle of 70% while the other waveform has a duty cycle of 100%. So during each period of the PWM waveform applied to the bulb, for part of the period the 70% PWM waveform is on and for the other part of the period the PWM waveform with a duty cycle of 100% is on. By varying the duty cycle of the waveforms and the time that each waveform is on, the arc can be stabilized and controlled for operation in different orientation. By having a PWM signal that only for part of PWM period is on with a shorter duty cycle it is possible to achieve this stabilization with much lower overhead and significantly better efficacy and lower cost. So even though a single constant PWM waveform with 95% duty cycle is not capable of stabilizing the arc, by using a combination of two or more PWM signals that effectively will have approximately a similar overhead to a 95% duty cycle PWM, one can stabilize and control the arc. In addition to the reduction in overhead power needed, having two or more waveform allows for a wider parameter space that provides the ability to stabilize a larger variety of bulb geometries, bulb fills, and orientations that a single PWM waveform may not be able to.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

Figure 1A:
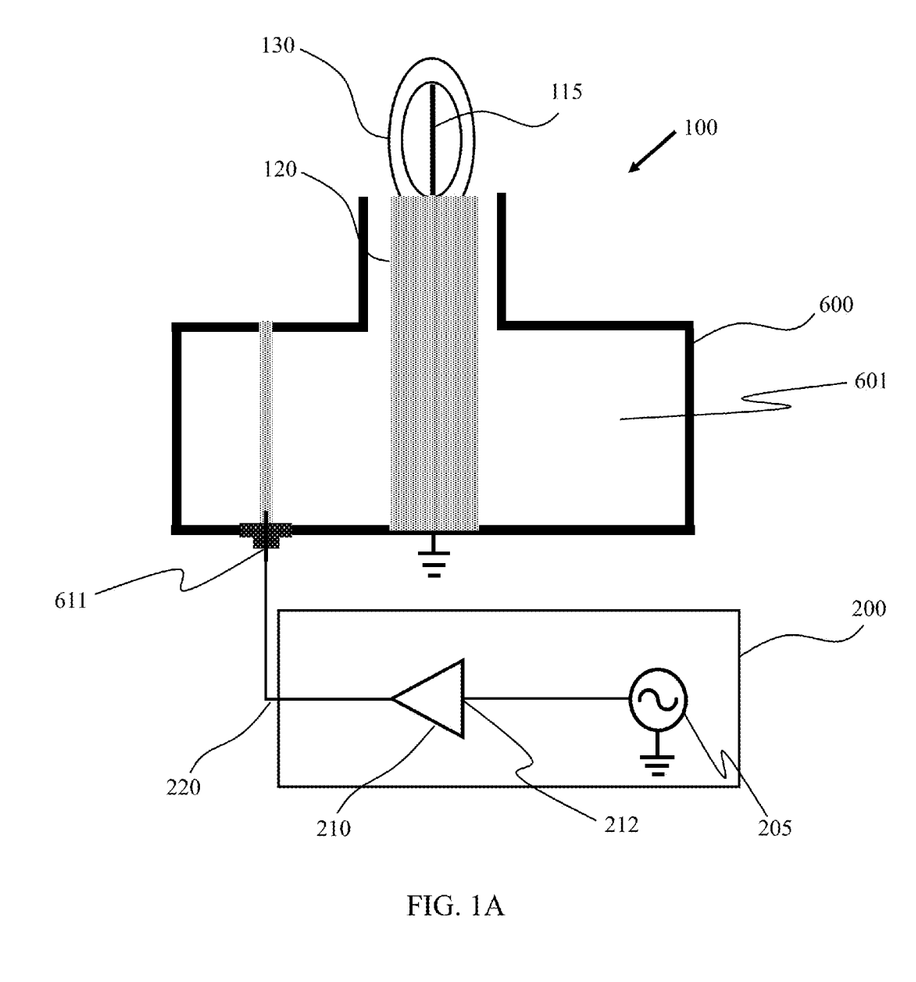
FIG. 1A illustrates a simplified cross-sectional diagram of a plasma lamp device using a compact air resonator with a simplified block diagram of an RF driver.

FIG. 1A illustrates a simplified cross-sectional diagram of a plasma lamp device using a compact air resonator 100 with a simplified block diagram of an RF driver 200. This diagram is merely an example, which should not unduly limit the scope of the claims herein. One of ordinary skill in the art would recognize other variations, modifications, and alternatives. The plasma lamp device employs a substantially hollow metallic lamp body 600, enclosing the unfilled space 601. Metallic lamp body 600 constitutes an electrical ground, as indicated.

The quartz bulb (gas-fill vessel) 130 is attached to one end of the output coupling element 120, which is a solid metallic cylindrical post. The other end of the output coupling element is attached to the lamp body. The gas-fill vessel 130 contains an inert gas such as Argon and a light emitter comprising of materials such as Mercury, Sodium, Dysprosium, Sulfur, or a metal halide salt such as Indium Bromide, Scandium Bromide, Thallium Iodide, Holmium Bromide, Cesium Iodide or other similar materials (or it can simultaneously contain multiple light emitters). The top of output coupling element 120 closely receives and is in intimate contact with gas-fill vessel 130, which when excited by the electromagnetic field near the output coupling element 120 forms a radiant plasma filament (arc) 115. Depending on orientation, bulb dimensions, driving frequency, temperature, and other factors, the arc shape varies. Sometimes, when the light emitting plasma becomes unstable, the arc shape changes, which gives an appearance of flickering, splitting, or rotation. For high efficiency output, this is highly undesirable. In addition, the amount of light varies depending on the arc shape of the light emitting plasma.

The simplified block diagram of the RF driver 200 shows an RF oscillator 205 and an RF power amplifier 210. The RF oscillator couples RF energy to an input 212 of the RF power amplifier, and an output 220 of the RF power amplifier is coupled to an input 611 of the lamp body 600 coupling RF energy into the resonator. The RF driver 200 may include additional components, such as electronic control module. The electronic control module is configured to control the output of RF driver 200. In various embodiments, the electronic control module is configured to turn the RF driver 200 off under various conditions, such as overheating, power surge, and others. The RF driver 200 may additionally include a PWM switching module that generates PWM waveforms to control the output of the RF driver 200, as explained below.

Figure 1B:
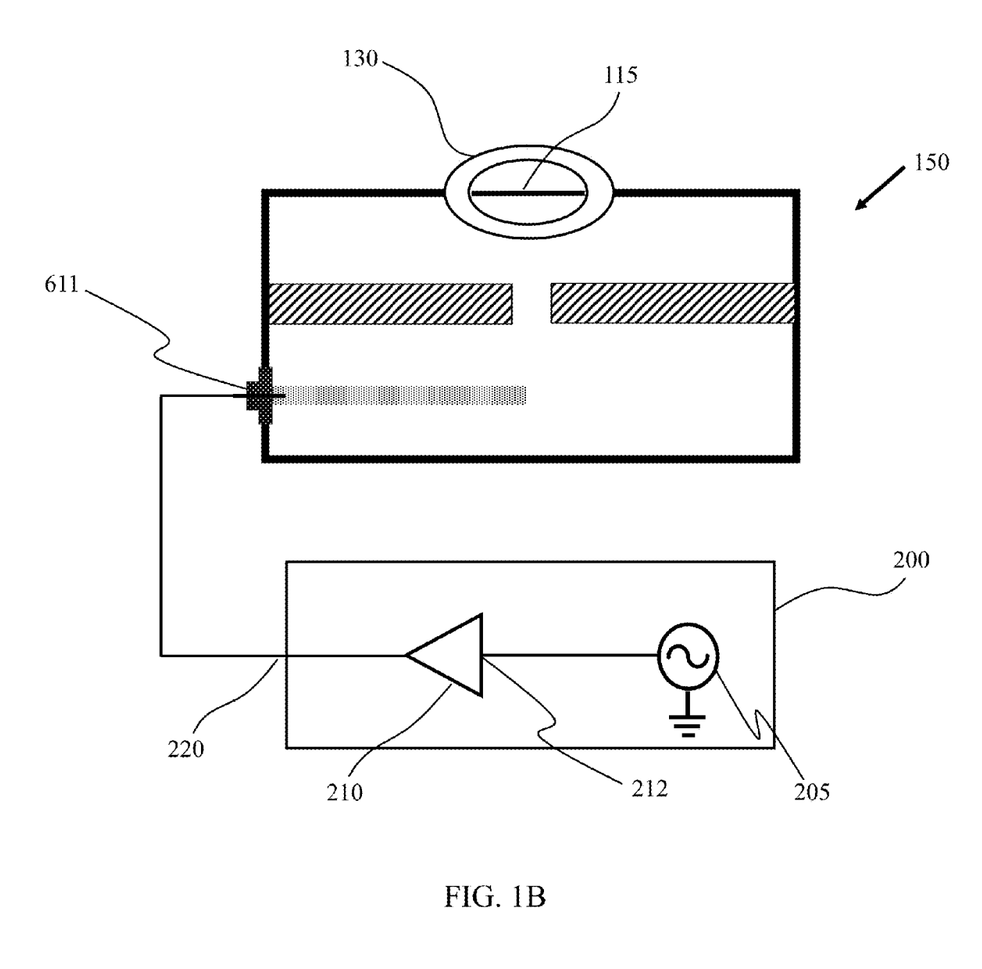
FIG. 1B illustrates a simplified cross-sectional diagram of a plasma lamp device using a dielectric resonator with a simplified block diagram of an RF driver.

FIG. 1B is a simplified cross-sectional diagram of a plasma lamp device using a dielectric resonator 150 with a simplified block diagram of an RF driver 200. The quartz bulb (gas-fill vessel) 130 is partially inside the dielectric resonator such that the light generated by the plasma and the arc 115 is partially blocked by the dielectric resonator. RF driver 200, similar to the RF driver in FIG. 1A comprises of an oscillator 205 and an RF power amplifier 210. The output of the RF driver 220 is coupled through 611 into the dielectric resonator. The RF driver 200 may include additional components, such as electronic control module. The electronic control module is configured to control the output of the RF driver 200. In various embodiments, the electronic control module is configured to turn the RF driver 200 off under various conditions, such as overheating, power surge, and others. The RF driver 200 may additionally include a PWM switching module that generates PWM waveforms to control the output of the RF driver 200, as explained below.

Figure 2A:
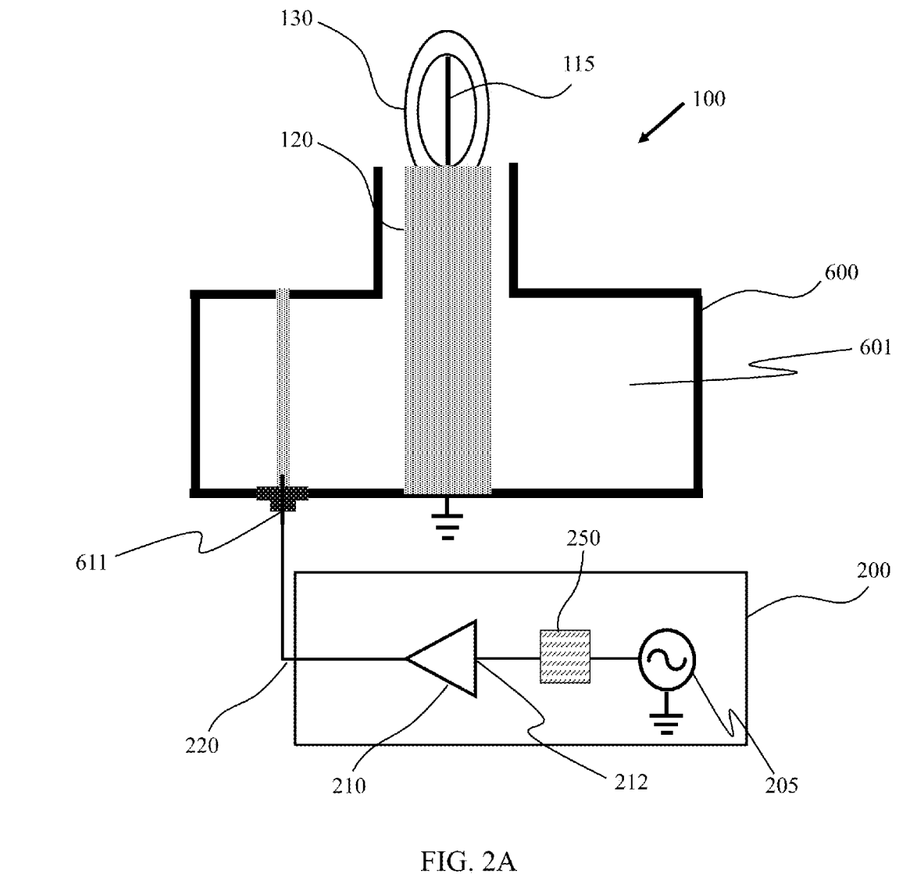
FIG. 2A illustrates a simplified cross-sectional diagram of a plasma lamp device using a compact air resonator with a simplified block diagram of an RF driver that has a PWM module.

FIG. 2A illustrates a simplified cross-sectional diagram of a plasma lamp device using a compact air resonator similar to FIG. 1A and an RF driver 200 that is also similar to the RF driver in FIG. 1A except a PWM module 250 has been added between the oscillator 205 and the RF power amplifier 210. This diagram is merely an example, which should not unduly limit the scope of the claims herein. One of ordinary skill in the art would recognize other variations, modifications, and alternatives. In one embodiment the PWM module comprises of a fast RF switch that can be controlled by an electronic control module with the appropriate waveform and by switching the output of the oscillator 205 that is coupled to the input 212 of the RF power amplifier 210, PWM waveforms of various duty cycles and durations can be generated that are coupled to the resonator and the bulb. In another embodiment the electronic control module can generate the PWM waveforms and directly modulate the RF oscillator.

Figure 2B:
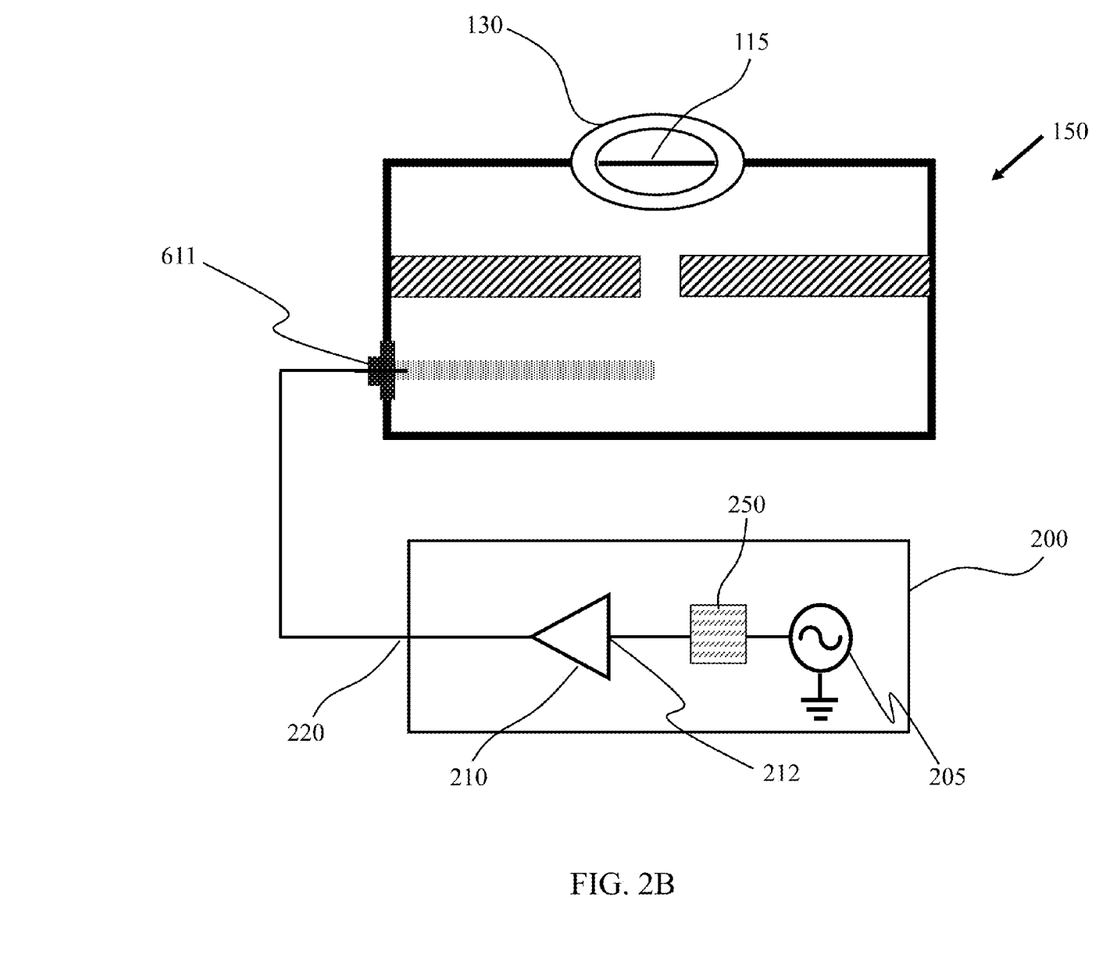
FIG. 2B illustrates a simplified cross-sectional diagram of a plasma lamp device using a dielectric resonator with a simplified block diagram of an RF driver that has a PWM module.

FIG. 2B illustrates a simplified cross-sectional diagram of a plasma lamp device using a dielectric resonator similar to FIG. 1B and an RF driver 200 that is also similar to the RF driver in FIG. 1B except a PWM module 250 has been added between the oscillator 205 and the RF power amplifier 210. This diagram is merely an example, which should not unduly limit the scope of the claims herein. One of ordinary skill in the art would recognize other variations, modifications, and alternatives. In one embodiment the PWM module comprises of a fast RF switch that can be controlled by an electronic control module with the appropriate waveform and by switching the output of the oscillator 205 that is coupled to the input 212 of the RF power amplifier 210, PWM waveforms of various duty cycles and durations can be generated that are coupled to the resonator and the bulb. In another embodiment the electronic control module can generate the PWM waveforms and directly modulate the RF oscillator.

Figure 3A:
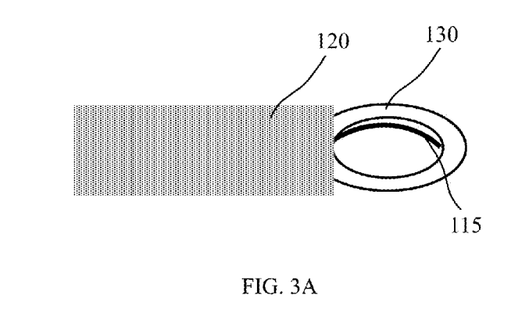
FIG. 3A illustrates the arc shape with bulb in horizontal position and with PWM off.

FIG. 3A illustrates the arc shape 115 inside the bulb 130 for the bulb in the horizontal position and with PWM off for the lamp in FIG. 2A. The arc shape can come in close proximity of the bulb's wall and in some cases touch the wall resulting in reduced performance and reliability. For example, other factors being equal, bowed arc shape typically translates to an efficacy reduction of about 5~15% compared to the efficacy of straight arc shape. This diagram is merely an example, which should not unduly limit the scope of the claims herein. One of ordinary skill in the art would recognize other variations, modifications, and alternatives.

Figure 3B:
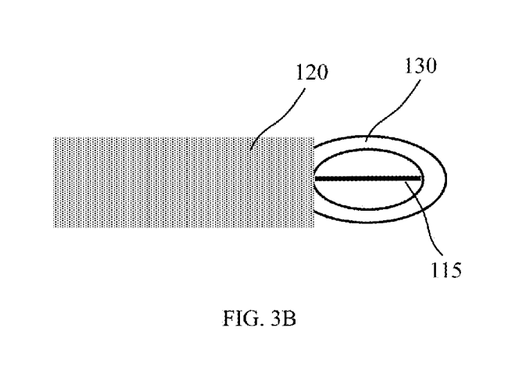

FIG. 3B illustrates the arc shape 115 inside the bulb 130 for the bulb in the horizontal position and with PWM on for the lamp in FIG. 2A. With the appropriate switching PWM waveform the bowing of the arc can be significantly reduced and/or substantially eliminated and kept away from the walls of the bulb.

Figure 3C:
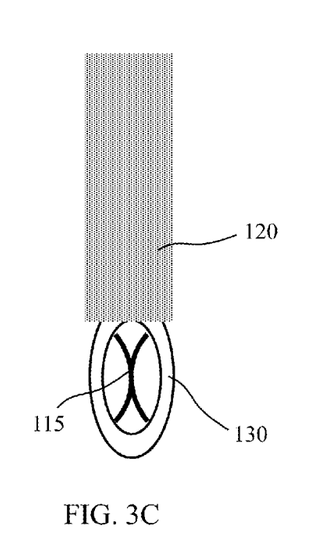
FIG. 3C illustrates the arc shape with bulb pointing down (vertical base-up). In this case the arc has split into two arcs.

FIG. 3C illustrates the arc shape 115 inside the bulb 130 with the bulb positioned to point vertically downward (vertical base up) with PWM off for the lamp in FIG. 2A. Depending on the gaseous composition inside the bulb as well as other parameters such as the size of the bulb, RF power, etc., the arc can split into two or more arcs and in some cases flicker and rotate. This diagram is merely an example, which should not unduly limit the scope of the claims herein. One of ordinary skill in the art would recognize other variations, modifications, and alternatives.

Figure 3D:
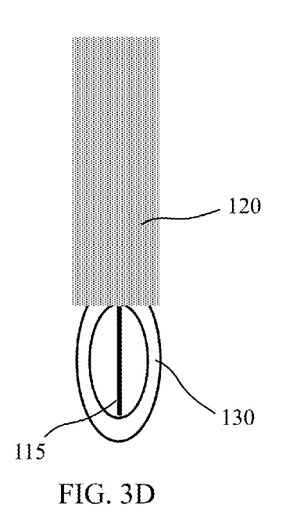
FIG. 3D illustrates the desirable arc shape with the bulb pointing down (vertical base-up).

FIG. 3D illustrates the arc shape 115 inside the bulb 130 for the bulb positioned to point vertically downward (vertical base up) with PWM on for the lamp in FIG. 2A. With the appropriate PWM waveform the arc can be stabilized into a single arc.

Figure 4A:
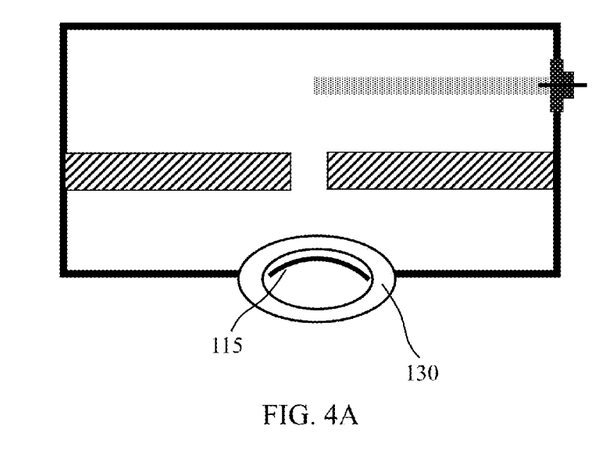
FIG. 4A illustrates a plasma lamp with a dielectric resonator with the bulb in horizontal position and arc bending up.

FIG. 4A illustrates the plasma lamp from FIG. 2B with the bulb 130 in horizontal position and with PWM off. The arc 115 is bending upward and coming in close proximity of the surface of the quartz bulb.

Figure 4B:
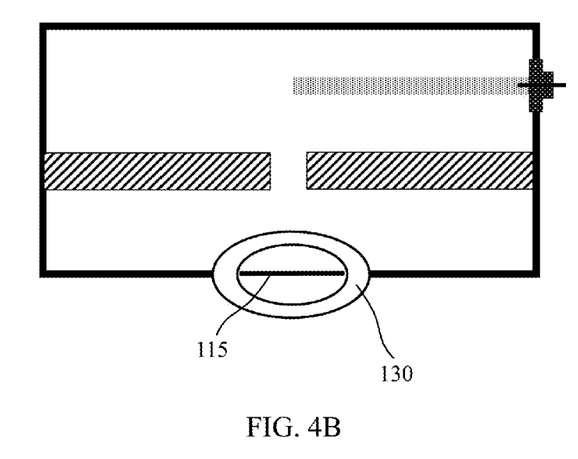
FIG. 4B illustrates a plasma lamp with a dielectric resonator with the bulb in horizontal position and the arc has been straightened using PWM.

FIG. 4B illustrates the plasma lamp from FIG. 2B with the bulb 130 in horizontal position and with PWM on. With the appropriate switching PWM waveform the bowing of the arc can be significantly reduced and/or substantially eliminated and kept away from the walls of the bulb.

Figure 4C:
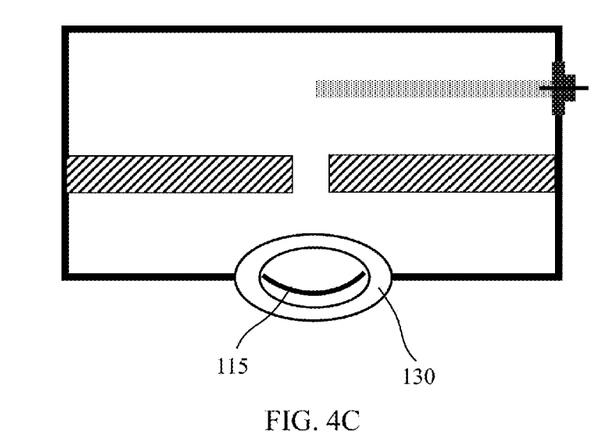
FIG. 4C illustrates a plasma lamp with a dielectric resonator with the bulb in horizontal position and the arc has is bending down away from the resonator.

FIG. 4C illustrates the plasma lamp from FIG. 2B with the bulb 130 in horizontal position and with PWM on. In this case a different PWM waveform is used to bend the arc away from the resonator and expose more of the arc to increase the light output from the lamp and improve overall efficacy of the lamp.

Figure 5:
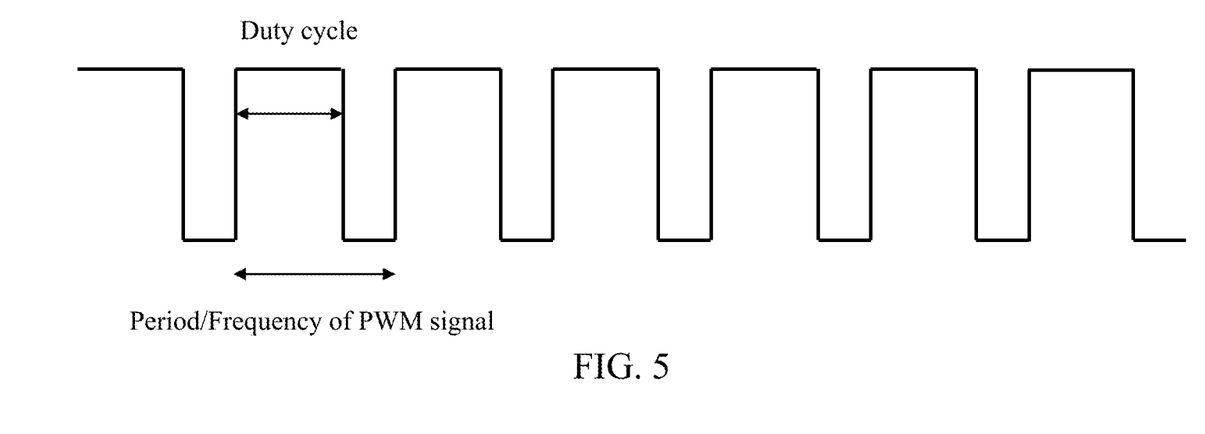
FIG. 5 illustrates a typical PWM waveform with a constant duty cycle.

FIG. 5 illustrates a typical PWM waveform, which has a constant duty cycle and is always on. Depending on the duty cycle of the PWM waveform the overhead required for the power amplifier to deliver the same average power with PWM off increases significantly. This will require much larger power transistors adding cost as well as lowering the efficiency of the RF driver.

Figure 6A:
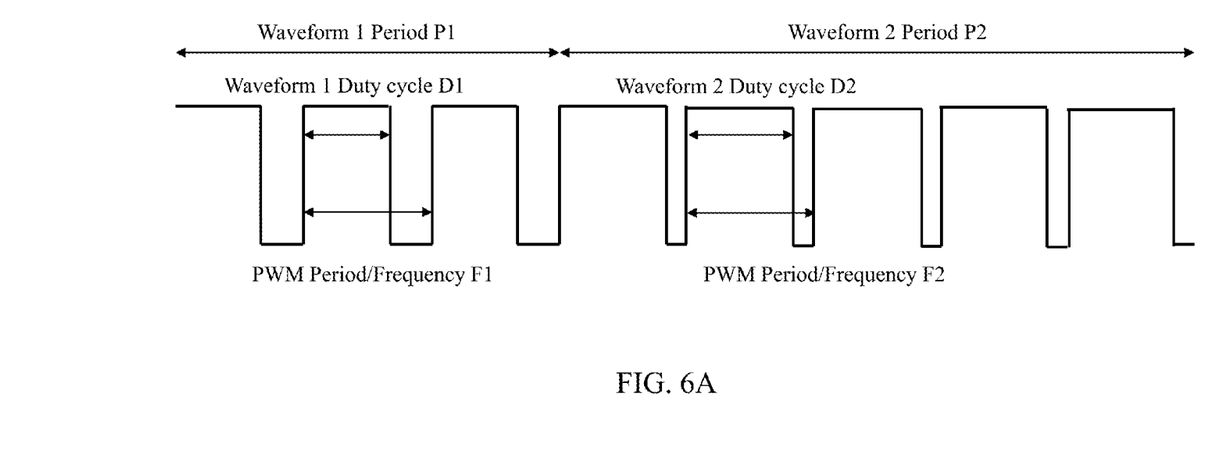
FIG. 6A illustrates a PWM waveform used in an embodiment of this invention that comprises of two PWM waveforms with different duty cycles.

FIG. 6A illustrates a PWM waveform used in an embodiment of this invention that comprises of two PWM waveforms with different duty cycles. Each waveform is on for a different period P1 and P2 and has a different duty cycle D1 and D2. By using a combination of different duty cycles and the period that each PWM signal is on, the arc can be stabilized or straightened. In an example, the advantage of this invention is that for most of the period that PWM is applied a PWM with a longer duty cycle is used lowering the overhead required for the power amplifier significantly improving the overall system efficacy. In addition, the invention provides a larger parameter space that allows for stabilization and deflection of arc contained in a wider variety of bulb geometries, fills, and orientations.

Figure 6B:
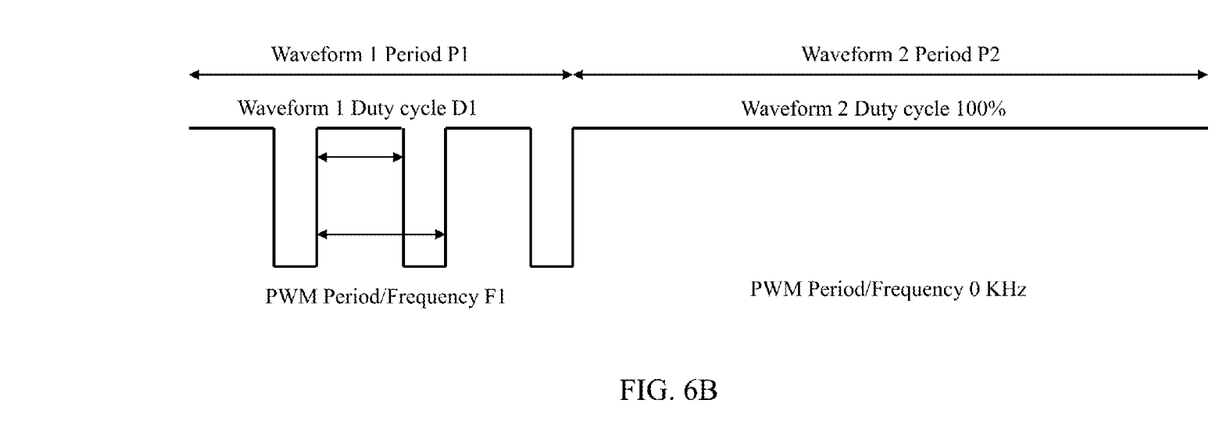
FIG. 6B illustrates another PWM waveform used in an embodiment of this invention that comprises of two PWM waveforms, one of which has a 100% duty cycle.

FIG. 6B illustrates another PWM waveform used in an embodiment of this invention that comprises of two PWM waveforms one of which has a 100% duty cycle. By replacing part of the PWM waveform with a 100% duty cycle waveform the overhead required for the RF power amplifier is significantly reduced. In addition, the invention provides a larger parameter space that allows for stabilization and deflection of arc contained in a wider variety of bulb geometries, fills, and orientations.

Thus is to be appreciated that various embodiments of the present invention allow the arc plasma to stay in a desired state/mode (typically straight arc) by using switching pulse-width modulation (PWM) techniques comprising of two or more PWM waveforms with different, frequencies, duty cycles, and durations.

It is to be appreciated that the embodiments of the present invention use switching PWM to deflect and stabilize the plasma arc in electrode-less lamps to mitigate the issues when operating the lamp in various (e.g., horizontal and vertical) orientations. In an embodiment, the technique uses a repeating switching waveform comprising of a continuous wave (100% duty cycle) and pulse-width modulated (PWM) waves with modulation frequencies of 0.1 KHz to 200 KHz. The switching PWM makes it possible to have an orientation independent lamp and allows for the use of high lumens bulb doses that are otherwise unstable.

In the embodiment, the switching waveform is produced by an electronically controlled switch at the output of the signal generator. This switch is programmed to produce a signal waveform comprising of periods of a continuous or near-continuous waves and periods of PWM waves. The overall waveform acoustically modulates the plasma arc, resulting in deflecting and stabilizing the arc.

It is to be appreciated that while PWM can be used to stabilize plasma arc, the stabilizing effect is derived from proper PWM settings according to embodiments of the present invention. Without the right settings, using pure PWM waves with a fixed duty cycle for the plasma lamps typically results in significant overhead associated with operation of the RF power amplifier. The observation that the plasma takes a period of time after the PWM is turned off for the plasma to revert back to the state before the PWM was applied led to the innovation in this patent of using a switching PWM waveform to stabilize the arc with substantially less overhead, higher efficacy, and lower cost. It is to be appreciated that this effect is used to improve plasma lamp performance by switching between periods of continuous (or near-continuous) wave operation and PWM operation. Moreover, PWM can also be used for switching between periods of PWM operation with different duty cycles, frequency settings, and durations.

The switching can be added as a capability to the RF driver by using an electronically controlled switch at the output of the signal generator. For example, the electronically controlled switch is configured to set waveform's with the following parameters: periods (in the range of about 0.1-100 ms), duty cycles (in the range of about 30%-100%), and PWM frequencies (in the range of about 0.1 KHz-200 KHz). With the right parameters, a lamp could operate with a stable arc (no flickering, spinning, splitting of the arc, or not have the arc kinked or against the wall of the bulb) in any orientation (360 degree rotation). In addition to the waveform parameters, the settings also depend on other parameters, which include but not limited to bulb geometry, bulb fill chemistry, input power, resonator geometry, and driver implementation.

It is to be appreciated that the switching PWM as used in various embodiments of the present invention is useful for arc stability for orientation independent operation, bulbs with high lumens fills, and bulb geometries that may otherwise be unstable. For example, plasma bulbs typically contain mercury material, which contributes to plasma arc buoyancy and instability. The instability can be contributed to convection current within the bulb and temperature gradient inside the bulb where heat is collected at one spot. The switching takes advantage of hysteresis effect to stabilize the plasma arc.

Figure 7:
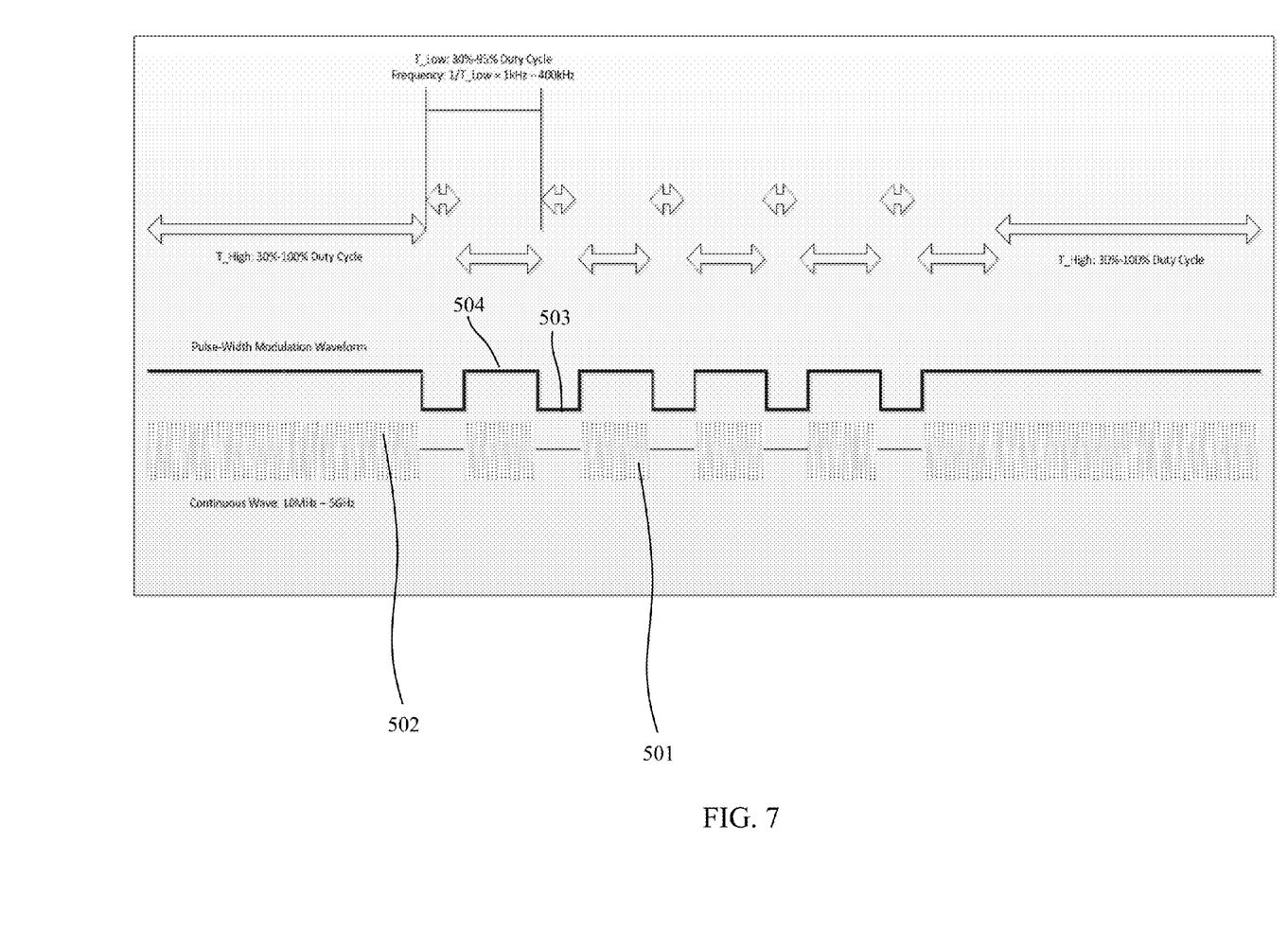
FIG. 7 illustrates a sample switched PWM waveform used in an embodiment of this invention comprising of a PWM waveform with 100% duty cycle (continuous) within periods of PWM with a lower duty cycle.

FIG. 7 is a simplified diagram illustrating PWM operation used in a plasma lamp according to embodiments of the present invention. This diagram is merely an example, which should not unduly limit the scope of claims. As shown in FIG. 7, the RF driver generates a continuous waveform 502 at a frequency of about 10 MHz to 5 GHz. In a specific embodiment, the continuous waveform 502 has a frequency of about 433 MHz, which is within the ISM band specified by ITU. The PWM waveform 501 can be a frequency of about 0.1 kHz to 200 kHz, and the duty cycle of the PWM 501 can be about 30% all the way to 100% (which is equivalent to a continuous waveform). In various embodiments, the frequency of continuous waveform 502 of RF driver and the PWM 501 frequency have a predetermined ratio, which can be 1/1, 1000/1, or others. As shown, the continuous waveform 502 is off when the PWM 501 is off at 503, and on when PWM 501 is on at 504. Typically, it is desirable for the continuous waveform 502 to be on, thereby allowing more energy to be delivered to the plasma bulb. As explained above, the PWM is used to change the arc shape state/mode of the plasma bulb. For example, the content of plasma bulb comprises, among other things, mercury material, which can be unstable during option and cause changes and/or flickering of light emitting plasma. In a specific embodiment, a PWM with a frequency of 38.25 KHz, 70% duty cycle, and a period of 2 ms is used to control the power delivered from a 433 MHz continuous waveform to a plasma bulb that contains about 3.5 mg of mercury and has a dimension of about 8×10×22 mm. It is also to be appreciated that by the use of PWM switching also reduced overall power consumption of the plasma lamp system.

The PWM switching, as described above, is used to stabilizing arc shape of the light emitting plasma. It is to be appreciated that PWM can also be used as a part of power control and/or dimming control scheme. In a preferred embodiment, the PWM switching is implemented as a functionality of the RF driver (e.g., RF driver 200 as shown in FIG. 2A). The RF driver is specifically adapted to sweep PWM setting to determine a PWM setting that stabilizes arc shape of the plasma bulb. For example, the PWM switching sweeps through duty cycle setting of the PWM from 75% to 100% to determine at what duty cycle setting the arc shape of plasma bulb is stable, and the PWM switching would operate in that duty cycle. These and other details of the present invention can be found throughout the present specification and more particularly below.

EXAMPLES

To prove the principles and operation of the invention, we have performed experiments using a plasma lamp apparatus configured with an RF power source having multiple PWM waveforms. We used a plasma lamp apparatus. The apparatus includes a bulb having a length of 22 mm and width of 10 mm. The bulb is made of quartz. The bulb comprises a fill material including Argon, mercury, and one or more metal halides. The apparatus has a resonator structure coupled to the bulb. The resonator structure is similar to the one described in U.S. Pat. No. 7,830,092. The apparatus has an RF power source capable of generating a first PWM waveform, a second PWM waveform, and an Nth PWM waveform. The RF power source comprises an output, which is coupled to the bulb via the resonator structure. The apparatus has a PWM module comprising a switch device configured in or to the output of the RF power source. The apparatus includes a microcontroller device coupled to the PWM module. The microcontroller device is capable of controlling an output of the RF power source to switch via the PWM module between each of the PWM waveforms.

As an example, switching between two waveforms where: Waveform 1 (Frequency: 38 kHz, Duty Cycle: about 60%, and Duration: 2 ms) and Waveform 2 (Frequency: 38 kHz, Duty Cycle: 100%, and Duration: 8 ms), can provide stabilization for the bulb geometry and fill described previously.

Figure 8A:
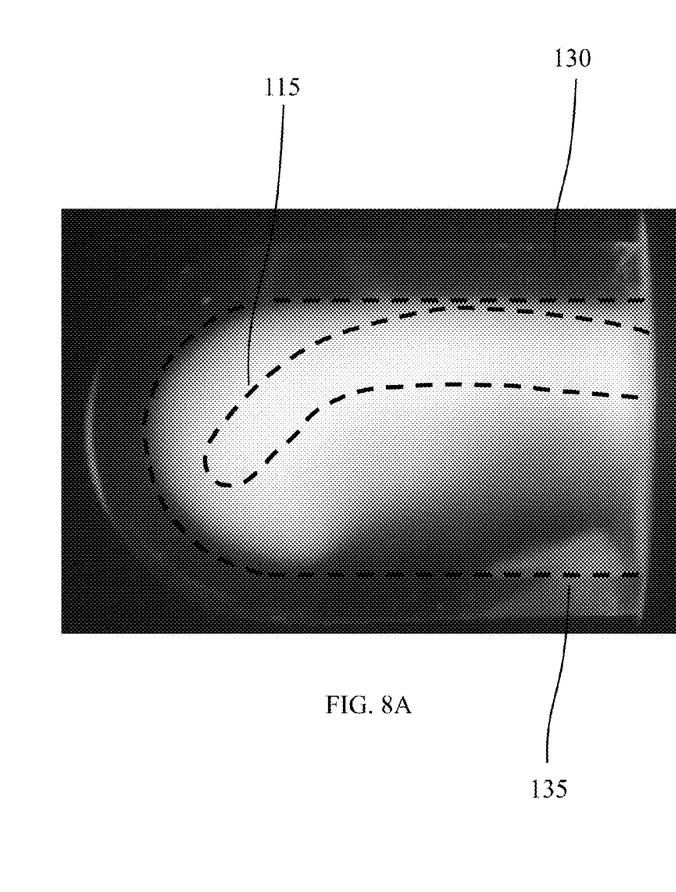
FIG. 8A is an image of a bulb in the horizontal orientation showing the arc bending upward.
Figure 8B:
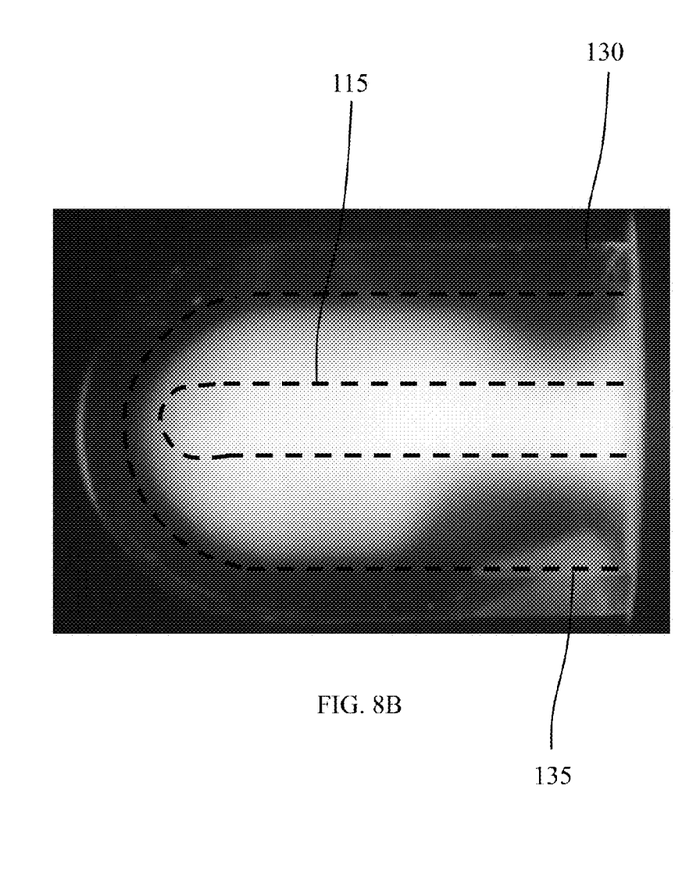
FIG. 8B is an image of a bulb in the horizontal orientation with the PWM waveform applied to the bulb resulting in straightening the arc.

Experimental results are provided as shown in FIGS. 8A and 8B.

FIG. 8A is an image of a quartz bulb 130 in the horizontal orientation showing an arc 115 bending upward and coming in contact with the inside surface 135 of the quartz bulb.

FIG. 8B is an image of the quartz bulb 130 shown in FIG. 8A with PWM switching waveform applied to the bulb resulting in straightening of arc 115 and keeping it away from the inside surface 135 of the quartz bulb.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A method for operating a plasma lamp apparatus, the method comprising:
    supplying RF power to a bulb of a plasma lamp, the bulb comprising a gaseous fill material, the RF power comprising a first pulse width modulation (PWM) waveform and a second PWM waveform, the first PWM waveform being characterized by a first duty cycle, a first frequency, and a first duration, the second PWM waveform being characterized by a second duty cycle, a second frequency, and a second duration,
    wherein the RF power comprises an Nth pulse width modulation waveforms, where N is an integer greater than 2, the Nth PWM waveform being characterized by an Nth duty cycle, an Nth frequency, and an Nth duration; wherein the Nth PWM waveform can be different from the other waveforms; and
    switching the RF power from the first PWM waveform to the second PWM waveform to cause change in a plasma discharge from the bulb from a first arc mode to a second arc mode.

2. The method of claim 1 wherein the first duration is different from the second duration.

3. The method of claim 1 wherein the first duty cycle is different from the second duty cycle.

4. The method of claim 1 wherein one of the duty cycles has a duty cycle of 100%.

5. The method of claim 1 wherein the first frequency is different from the second frequency.

6. The method of claim 1 wherein the first arc mode is characterized by a first arc shape, a first arc spatial location, and a first arc intensity; and wherein the second arc mode is characterized by a second arc shape, a second arc spatial location, and a second arc intensity.

7. The method of claim 1 wherein the switching of the RF power causes the plasma discharge to stabilize and be substantially free from arc splitting, arc rotating, or arc flickering; and wherein the first arc mode causes a stable arc and the second arc mode causes an unstable arc, the stable arc being positioned within a center region of the bulb.

8. The method of claim 1 wherein the switching of the RF power causes the arc to be spatially disposed within a center region of the bulb away from an interior surface of the bulb to increase the reliability of the bulb.

9. The method of claim 1 wherein the switching between PWM waveforms maintains the arc regardless of a spatial position of the bulb with respect to a direction of gravity.

10. The method of claim 1 wherein the PWM switching technique reduces the RF power overhead of an RF amplifier.

11. The method of claim 1 further comprising determining the first PWM duty cycle and the second PWM duty cycle to cause a stable arc shape of the plasma discharge.

12. The method of claim 1 wherein the RF power comprising a source frequency of about 433 MHz.

13. A method for operating a plasma lamp apparatus, the method comprising:
    generating an RF signal from a signal generating source;
    coupling the RF signal to a resonator structure coupled to a bulb having a fill material, the bulb being formed from a transparent or translucent material;
    exciting the fill material to form an arc within the bulb to cause output of electromagnetic radiation; and
    modulating the RF signal to generate a switching pulse width modulated (PWM) waveform to maintain the arc within a spatial region of the bulb,
    wherein the switching PWM waveform causes a deflection in a spatial appearance of the arc.

14. The method of claim 13 wherein the RF signal is characterized by a frequency ranging from 1 MHz to 10 GHz.

15. The method of claim 13 wherein the resonator structure comprises a dielectric material or a fluid material comprising air.

16. The method of claim 13 wherein the arc is unstable outside of the spatial region.

17. The method of claim 13 wherein the bulb is configured in an upright manner relative to gravity.

18. The method of claim 13 wherein the switching PWM waveform is characterized as an acoustic modulation.

19. The method of claim 13 wherein the PWM waveform comprises a plurality of pulses, each of the pulses comprises a maximum region and an inflection region.

20. The method of claim 13 wherein the PWM waveform comprises a plurality of pulses, each of the pulses comprises two or more switching PWM waveforms.

21. A method for operating a plasma lamp apparatus, the method comprising:
    providing the plasma lamp, the plasma lamp comprising a power source and a bulb, the bulb comprising gaseous filling material, the power source being configured to provide RF signals at a first frequency to the bulb, the first frequency being about 300 MHz to 600 MHz, the power source comprising a PWM module for providing pulse-width modulation for the RF signals, the pulse-width modulation being characterized by a modulation frequency about 1 KHz to 200 KHz;

providing RF signals to the bulb at a first PWM duty cycle to excite at least the gaseous filling material of the bulb, the gaseous filing material forming a light characterized by a first arc shape;

providing RF signals to the bulb at a second PWM duty cycle to excite at least the gaseous filling material of the bulb, the gaseous filing material forming a light characterized by a second arc shape, the second arc shape being different from the first arc shape; and sweeping PWM setting to determine a PWM setting that stabilizes the arc shape of the plasma bulb.

22. The method of claim 21 further comprising determining a stabilizing PWM duty cycle by sweeping the PWM duty cycle between about 75% to 100%.

23. The method of claim 21 where, when the plasma lamp operates at a PWM setting other than the PWM setting that stabilizes arc shape of the plasma bulb, the arc shape is characterized by one or more of the following: a bowed arc shape, an arch shape in close proximity of the bulb's wall, an arch shape touching the wall, an arc shape splitting into two or more arc, an arc that flickers or rotates.

24. A plasma lamp apparatus comprising:
a bulb comprising a fill material;
a resonator structure coupled to the bulb;
an RF power source capable of generating a first PWM waveform and a second PWM waveform, the RF power source comprising an output, the output coupled to the bulb via the resonator structure;
a PWM module comprising a switch device configured to the output of the RF power source; and
a microcontroller device coupled to the PWM module, the microcontroller device being capable of controlling an output of the RF power source to switch via the PWM module from the first PWM waveform to the second PWM waveform,
wherein the first PWM waveform causes a deflection in a spatial appearance of the arc shape of the bulb, and the second PWM waveform stabilizes the arc shape of the bulb.

25. The apparatus of claim 24 wherein the PWM module comprises the microcontroller device and the RF power source.

26. The apparatus of claim 24 wherein the resonator structure comprising an air resonator structure.

* * * * *